July 2, 1963 F. W. SCHMIDLIN 3,096,431

INFORMATION HANDLING ARRANGEMENT

Filed Aug. 5, 1960 2 Sheets-Sheet 1

FREDERICK W. SCHMIDLIN
*INVENTOR.*

BY Jerry G. Dinardo
AGENT

Albert Rosen
ATTORNEY

FREDERICK W. SCHMIDLIN
*INVENTOR.*

BY Jerry A. Dinardo
AGENT
Albert Rosen
ATTORNEY

United States Patent Office 3,096,431
Patented July 2, 1963

3,096,431
INFORMATION HANDLING ARRANGEMENT

Frederick W. Schmidlin, Redondo Beach, Calif., assignor to Space Technology Laboratories, Inc., Los Angeles, Calif., a corporation of Delaware Filed Aug. 5, 1960, Ser. No. 47,740
12 Claims. (Cl. 235—61.11)

This invention relates to information handling arrangements, and more particularly to improvements in information converter and storage arrangements of the kind utilizing superconductive elements.

It is known that many materials lose all apparent electrical resistance when they are subjected to very low temperatures, in the vicinity of absolute zero. A material exhibiting this characteristic property is called a superconductor and the related phenomenon is termed superconductivity. The transition from the resistive state to the superconductive state occurs abruptly at a critical temperature known as the transition temperature, the particular temperature differing for each material.

It is also known that a transition from a superconducting to a resistive state can be induced in a superconductor by applying a magnetic field to the superconductor. The magnetic field can be applied externally to the superconductor or it can be induced internally by the flow of electric current through the superconductor. When the magnetic field or current is removed, the superconductor reverts to its superconducting state. In the presence of an external magnetic field, a superconductor requires less directly applied current, termed the critical current, to cause a transition than it does when there is no external magnetic field present.

Certain forms of radian energy, such as infrared and shorter wavelength radiant energy, are known to be capable of inducing superconducting to resistive transformations in superconductors carrying a current just below the critical current value.

Transitions between superconducting and resistive states can also be induced in a superconductor by raising its temperature, to render it resistive, and subsequently lowering the temperature to restore it to the superconducting state.

An object of this invention is to utlize the properties of superconductive elements in the handling of digital information.

A further object is to provide a novel information handling apparatus utilizing superconductive elements capable of responding to radiant energy.

This invention makes use of the phenomenon whereby a superconductive element may be transformed from the superconducting to the resistive state by means of high frequency radiant energy impinging upon the element. In accordance with one aspect of the invention apparatus is provided for converting digital information, as represented on a punched card, into corresponding electrical information in the form of superconducting currents stored in a matrix of superconductive elements. In one illustrative embodiment, a superconductive storage panel containing an array of superconductive storage units is mounted adjacent to a light source. Each storage unit includes a radiation responsive superconductive switch element and a superconducting inductance portion connected in electrical parallel. A data card containing stored information in the form of punched holes is fed between the light source and the superconductive storage panel so that the light passing through the punched holes can be focussed onto the superconductive switch elements.

In order to transfer the punched card information into the storage panel, a current of magnitude just below the critical current of the switch element is fed from a source through each of the switch elements. When the light source is energized, those switch elements receiving light through the punched holes are transformed to the resistive state while those switch elements which do not receive light remain superconducting. When a switch element is transformed by the impinging light, the current previously flowing therethrough is diverted from the relatively high resistance path through the switch element to the zero resistance path through the superconducting inductance portion. When the light source is de-energized, the previously excited switch elements revert to their superconducting state. Thereupon, the current source is de-energized, and the current flowing through the inductance portion circulates within the storage unit as a persistent memory current.

In the drawing, wherein like reference characters refer to like or corresponding parts:

Figure 1:
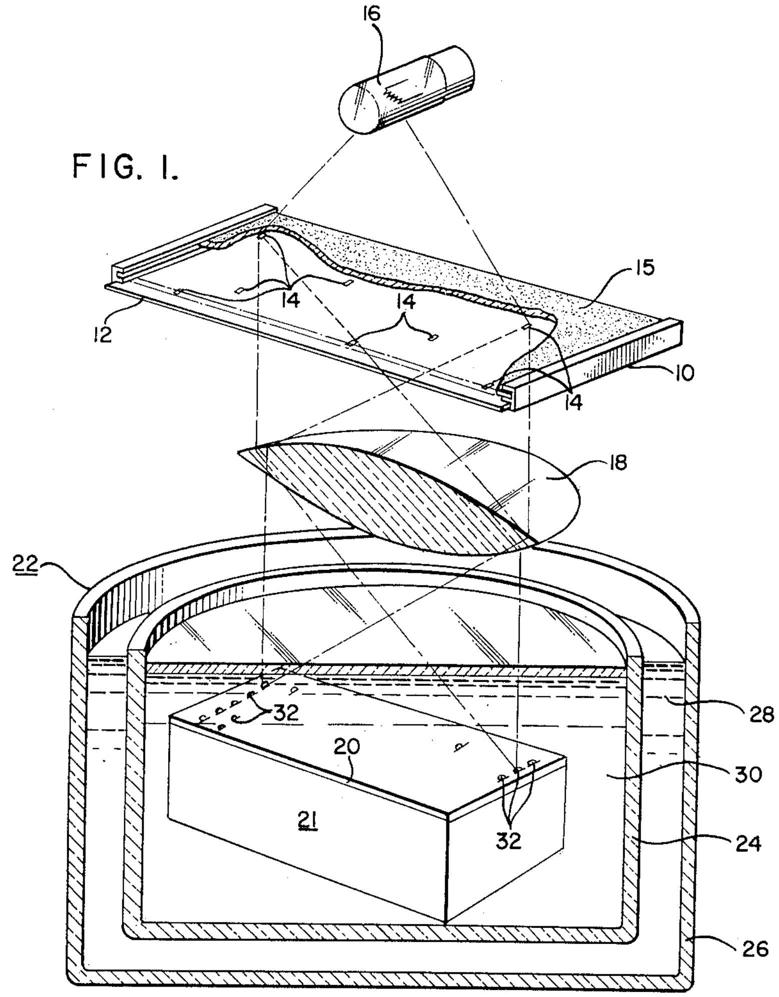
FIG. 1 is a schematic illustration of a punched card-to-superconductive memory transducting apparatus embodying the invention.

At temperatures near absolute zero some materials apparently lose all resistance to the flow of electrical current and become what appear to be perfect conductors of electricity. This phenomenon is termed superconductivity and the temperature at which the change occurs, from a normally resistive state to the superconductive state, is called the transition temperature. For example, the following materials have transition temperatures, and become superconductive ,as noted:

| | Kelvin |
|---|---|
| Niobium | 8° |
| Lead | 7.2° |
| Vanadium | 5.1° |
| Tantalum | 4.4° |
| Mercury | 4.1° |
| Tin | 3.7° |
| Indium | 3.4° |
| Thallium | 2.4° |
| Aluminum | 1.2° |

Only a few of the materials exhibiting the phenomenon of superconductivity are listed above. Other elements, and many alloys and compounds, become superconductive at temperatures ranging between 0° and arodund 20° Kelvin. A discussion of many such materials may be found in a book entitled, "Superconductivity" by D. Schoenberg, Cambridge University Press, Cambridge, England, 1952.

The above-listed transition temperatures apply only where the materials are in a substantially zero magnetic field. In the presence of a magnetic field the transition temperature is decreased. Consequently, in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled, "Magnetically Controlled Gating Element," granted to Dudley A. Buck.

In addition, the above-listed transition temperatures apply only in the absence of electrical current flow through the material. When a current flows through a material, the transition temperature of the material is decreased. In such a case the material may be in an electrically resistive state even though the temperature of the material is lower than the normal transition temperature. The action of a current in lowering the temperature at which the transition occurs (from a state or normal electrical resistivity to one of superconductivity) is similar to the lowering of the transition temperature by an external magnetic field, inasmuch as the flow of current itself induces a magnetic field.

Accordingly, when a material is held at a temperature below its normal transition temperature for a zero magnetic field, and is thus in a superconducting state, the superconducting condition of the material may be extinguished by the application of an external magnetic field or by passing an electric current through the material. The minimum values of magnetic field or electric current required to effect the superconducting to resistive transition are called the critical fields and critical current, respectively.

A thin film superconductor carrying a biasing current just below the critical current value, can be transformed from the superconducting to resistive state by high frequency electromagnetic radiant energy incident on the thin film. It is believed that one operation of such radiant energy transformation is due to the existence of interelectron energy levels in a superconductive material that correspond in energy to the energy quanta present in infrared and shorter wavelength radiant energy. This correspondence in interelectron energy levels enables the absorption of the radiant energy. The absorption of such radiant energy results in an increase in temperature of the film, and consequently lowers the critical current requirement of the film to a level below that of the biasing current flowing through the film. This results in a transformation of the entire film to the resistive state. It should be noted that substantially any wavelength of electromagnetic radiation can be used provided that the wavelength is at least as short as that in the far infrared region of the spectrum.

FIG. 1 shows one form of information converter and storage apparatus according to the invention. The apparatus includes a holder 10 into which is fed a data card 12 containing stored information in the form of apertures or punched holes 14. The information contained in the data card 12 is desired to be converted into electrically stored information. For this purpose, a light source 16 is arranged to illuminate the data card 12 through a ground glass member 15 mounted on the holder 10. The resulting image of the punched holes 14 is focussed by means of a lens 18 onto a superconductive storage panel 20 which forms a portion of a superconductive computer apparatus 21.

The superconductive computer apparatus 21 is maintained at a low temperature in the neighborhood of a few degrees Kelvin, the exact temperature being determined by the kind of superconductive materials used in the apparatus 21. To this end, a cryostat 22 is provided, including an inner container 24 mounted within an outer container 26, with the two containers 24 and 26 being separated by a first bath 28 containing liquid nitrogen. The inner container 24 holds a second bath 30 containing liquid helium in which the apparatus 21 is immersed.

The superconductive storage panel 20 includes an array of superconductive storage units 32, the number of units 32 being determined by the character of information contained in the data card 12. As shown schematically in FIG. 2, the superconductive storage units 32 are arranged in a matrix of rows and columns, only two rows and two columns being shown as exemplary of the matrix. Each superconductive storage unit 32 includes a radiation responsive superconductive switch element 34 connected in electrical parallel with a superconducting inductance portion 36. Both the switch element 34 and inductance portion 36 are preferably in the form of thin films. The inductance portion 36 is designed to have a substantially higher inductance than that of the switch element 34, as by making the inductance portion 36 extend over a longer physical path relative to the switch element 34.

The switch element 34 is made of a superconductive material having a relatively low transition temperature, such as tin or indium, so that it may be readily transformed in state by the application of relatively low currents and magnetic fields. The inductance portion 36, on the other hand, is made of a superconductive material having a relatively high transition temperature, such as lead or niobium, so that it will remain superconducting under conditions of high current flow or high applied magnetic fields. Alternatively, the switch element and inductance portion may be made of the same material but suitably dimensioned in thickness and in width to exhibit the necessary critical current and magnetic field characteristics.

All of the storage units 32 are connected in series by a superconductor 38 which threads along the rows and columns of the matrix. A plurality of vertical superconductors 38 (that is, vertical with respect to the illustration of FIG. 2) are arranged so that each superconductor extends along a vertical column of storage units 32. Each of the vertical superconductors 38 is inductively coupled to all of the inductance portions 36 in a given column. The inductive coupling is effected through vertical inductive members 40 connected in series in each vertical superconductor 38, with each vertical inductive member 40 disposed in current inducing relationship with an individual one of the inductance portions 36. Similarly, a plurality of horizontal superconductors 42 extend along the rows of the storage units 32, each horizontal superconductor 42 being inductively coupled to all of the inductance portions 36 in a given row by means of series connected horizontal inductive members 44.

In the operation of the information conversion and storage apparatus, a bias current $I_s$ is first fed to the series connected storage units 32 from a bias current source 46; this is effected by connecting a switch 48 to a terminal 49. The bias current $I_s$ has a magnitude just below the critical current value of each of the switch elements 34. In the transient period during the rise of the bias current to its steady state value, the bias current will encounter a relatively high impedance through the inductance portion 36 and a relatively low impedance through the switch element 34 because of the high inductance ratio of the inductance portion 36 relative to the switch element 34. Consequently, most of the bias current will tend to flow through the switch element 34 and very little, if any, of the current will flow through the inductance portion 36. Since the bias current is below the critical current value of each of the switch elements 34, the current flowing through each of the switch elements 34 will be insufficient of itself to transform the switch elements 34, and these elements will remain superconducting.

When it is desired to transfer the information contained in the data card 12 into the storage panel 20, the light source 16 is energized and the light passing through each of the punched holes 14 selectively irradiates an individual one of the switch elements 34. The addition of the light energy to the electrical energy passing through an irradiated switch element 34 is sufficient to transform the selected switch element 34 to the resistive state. Those switch elements 34 that are not irradiated do not experience any such change in state. The radiant energy emitted by the light source 16 may be in the infrared, visible, or ultraviolet spectrum, for example.

As a result of the transformation of an irradiated switch element 34 to its resistive state, the bias current is reduced in the selected switch element 34 and is increased in the corresponding inductance portion 36, until all of the bias current flows through the inductance portion 36. After this occurs, both the light source and the bias current source are de-energized in rapid sequence. The previously irradiated switch elements 34 return to the superconducting state, thereby trapping the currents then flowing through the inductance portions 36. The trapped currents now circulate in the selected storage units 32 as persistent currents. The currents stored in each of the selected storage units 32 are representative of the information contained in the corresponding punched hole 14 in the data card 12.

In order to interrogate the storage units 32, horizontal and vertical sensing current pulses $I_h$ and $I_v$ are applied to the horizontal and vertical superconductors 42 and 38, respectively. The sensing pulses $I_h$ and $I_v$ are of such a polarity and of such a magnitude as to induce, within a selected storage unit 32 lying at the intersection of a selected horizontal superconductor 42 and a selected vertical superconductor 38, a current that is additive with respect to the circulating current in the selected storage unit 32. This induced current is additive to the extent that the total current exceeds the critical current of the selected switch element 34 by an amount equal to the reduction of current through the switch element 34 while it was exposed to incident radiation. The proper value of the induced current is assured if the current induced in the storage element 32, by the combined effect of the sensing pulses $I_h$ and $I_v$, is just equal to the minimum critical current requirement of the switch element 34 when the latter is not exposed to the radiant energy (and is at the normal low temperature of the helium bath). As a result of the application of this interrogating current the switch element 34 is transformed to its resistive state, and the current flowing through the transformed switch element 34 causes a voltage pulse to appear across the switch element 34. The voltage pulse may be sensed by a voltage sensitive output circuit 50, which may be connected across the series connected storage units by connecting the switch 48 to a second terminal 51. The appearance of resistance in the switch element 34 causes the current in the inductance portion 36 and also in the switch element 34 to decrease until it falls below the critical current value, whereupon the switch element 34 again becomes superconducting. When the sensing current pulses $I_h$ and $I_v$ are terminated, the current in the inductance portion 36 and in the switch element 34 is reduced to zero. After the information previously written into the matrix is thus read out in serial fashion, the storage panel 20 is ready to be set for new input signals.

Figures 2, 3, 4:
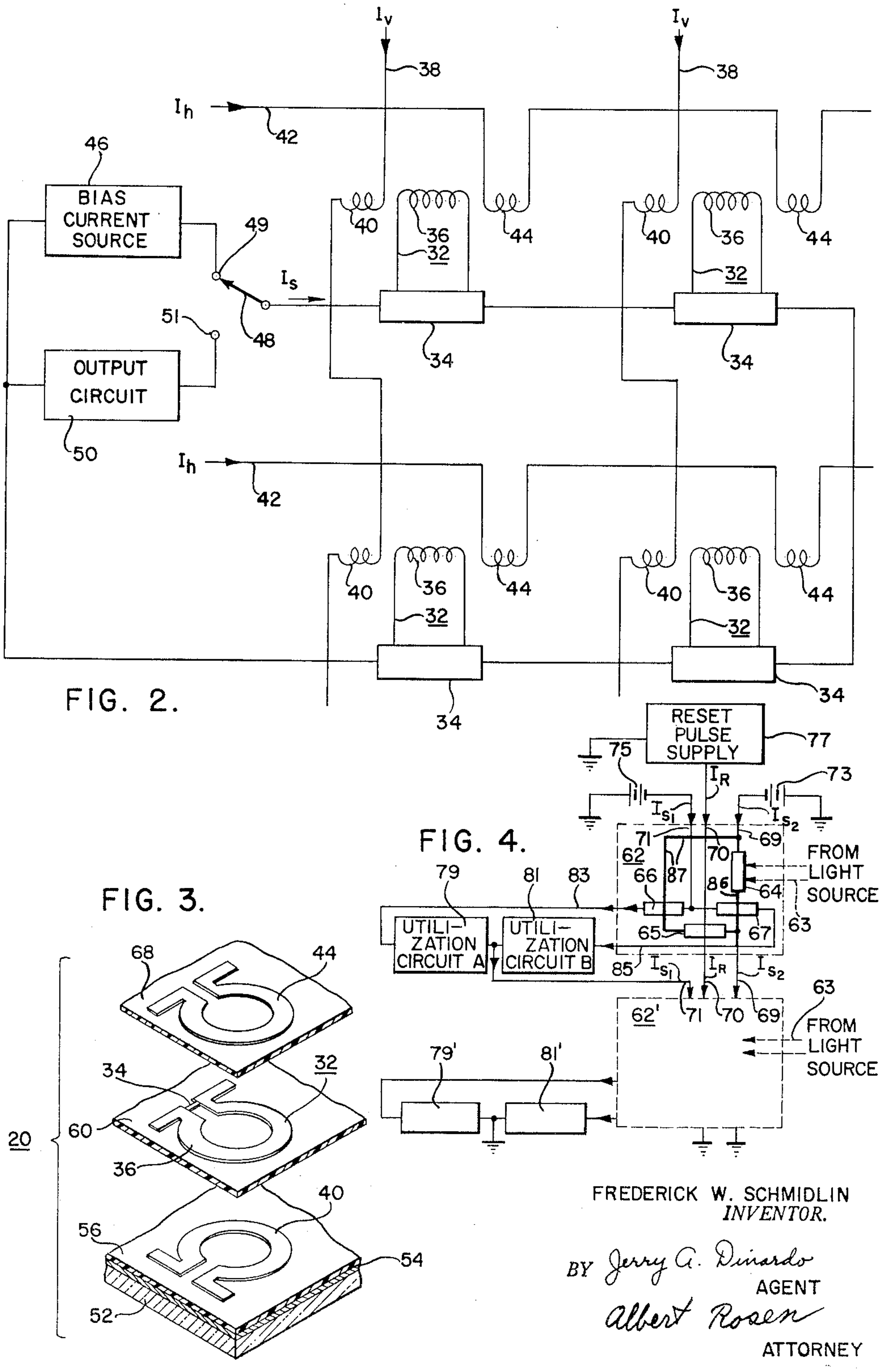
FIG. 2 is a schematic illustration of a circuit arrangement useful in connection with the apparatus of FIG. 1.
FIG. 3 is an exploded pictorial view of a portion of a superconductive memory or storage device used in the apparatus of FIG. 1.
FIG. 4 is a schematic illustration of another circuit arrangement useful in connection with the apparatus of FIG. 1.

FIG. 3 is an exploded view showing a portion of the construction of one form of the storage panel 20. Only one of the storage units 32 depicted in FIG. 2 is shown in FIG. 3, it being understood that any desired number of such units may be incorporated in a given storage panel 20. The storage panel 20 comprises a sheet-like insulating substrate 52 of glass, quartz, or a ceramic, with one side coated with alternate layers of thin film superconductors and insulation films. The substrate 52 is coated with a superconductive ground plane sheet 54 which serves as a ground return for the other superconductive members of the storage panel 20. The ground plane sheet 54 is in turn coated with a first insulation sheet 56. The first insulation sheet 56 is coated with a first arcuate shaped superconductive member 40, which may serve as the vertical inductive member 40 depicted in FIG. 2. The first arcuate shaped superconductive member 40 is coated in turn with a second insulation sheet 60 and a storage unit in the form of a second arcuate shaped superconductive member 32. The second arcuate shaped superconductive member 32 comprises a generally circular main body portion 36, constituting the inductance portion of the storage unit 32, and a relatively narrow, short strip portion 34 bridging the ends of the main body portion 36, the strip portion 34 serving as the switch element of the storage unit 32. The storage unit or second arcuate shaped member 32 is coated in turn with a third insulation sheet 68 and a third arcuate shaped superconductive member 44, the horizontal inductive member 44.

Each of the insulation sheets 56, 60, and 68 may comprise a vacuum deposited coating of silicon monoxide or of a polymerized in situ organic silicone material such as polydimethylsiloxane. (Such a polymerized in situ film may, for example, be made by subjecting the element to be covered with insulation to electron bombardment in an environment of a silicone oil vapor, the electron beam creating a solid polymer film on the element.) The silicon monoxide insulation film should be at least of the order of 1000 Angstrom units in thickness in order to avoid pinholing, while the polymerized in situ film should be at least of the order of 50 Angstrom units in thickness for the same purpose. The thinness of the third insulation film 68 is such as to render it substantially transparent. Consequently, light may be directed onto the switch element 34 through the film 68.

FIG. 4 is a schematic illustration of another super-conductive memory circuit arrangement useful in the punched card-to-superconductive memory transducing apparatus of FIG. 1, and in place of the memory circuit depicted in FIG. 2. In the arrangement of FIG. 4 the memory circuit or cell 62 makes use of a light controlled superconductive flip-flop to provide the desired memory storage. Unless otherwise indicated, all circuit leads are of superconductive materials and are normally maintained superconductive.

The memory cell 62 comprises a light responsive superconductive gate 64 that serves as one half of the flip-flop; light 63 from a light source (not shown) serves to render the gate 64 resistive so that current will flow through the by-pass circuit (leads 87) which serves as the second half of the flip-flop. The cell 62 also includes a pair of output gates 66 and 67. The memory cell 62 is constructed such that a current output (derived from the flow of current $I_{s1}$ through a lead 71 from one direct current power supply 75) is provided from the first output gate 66 in the absence of light impingement on the cell, and a current output is provided from the other output gate 67 in the presence of light impingement on the cell. The output gates 66 and 67, in turn, control respective utilization circuits A and B, numbered 79 and 81 in the drawing. The light responsive superconductive gate 64 is connected to another direct current power supply 73 so that current $I_{s2}$ through a lead 69 from this power supply may flow through the gate 64.

This gate 64 is superconductive so long as no light impinges upon it, as when the portion of the punched card (not shown) adjacent to the gate does not have an aperture, and is resistive in the presence of light impingement, as when the gate receives light through a punched card aperture. The second superconductive output gate 67 is positioned immediately adjacent to a lead 86 that carries current flow through the light responsive gate 64. This output gate 67 is constructed of a superconductive material dimensioned such that the magnetic field associated with current flow in the adjacent lead 86 will effect a transformation of the output gate 67 from the superconductive to the resistive state. Hence, the current $I_{s2}$ flows through the superconductive light responsive gate 64, and in interacting relationship with the output gate 67, so long as no light impinges upon the gate 64. Thus, this output gate 67 is resistive, or effectively non-conductive, in the absence of light on the gate 64, and the flow of current $I_{s1}$ from the first power supply 75 is then directed through the other output gate 66 and to utilization circuit A.

In the presence of light impingement upon the light responsive superconductive gate 64, this gate becomes resistive; the flow of current $I_{s2}$ from the power supply 73 is consequently channeled through the by-pass circuit 87. A portion of the by-pass circuit 87 is disposed immediately adjacent to the first output gate 66. Consequently, the flow of current through the by-pass circuit, instead of through the light responsive gate 64, results in the first output gate 66 being switched to a substantially non-conductive state. At the same time, absence of current flow through the light responsive gate 64 results in the other output gate 67 being transformed from the resistive state to the superconductive state. Hence, current $I_{S1}$ from the power supply 75 will now be directed through the second output gate 67 and to the utilization circuit B. Once initiated, the current flow through the second gate 67 will continue even if the exposure of the cell to light is terminated. The memory thus stored may be erased by actuation of a reset circuit to be described.

The by-pass circuit 87 includes a reset gate 65. This gate is normally superconductive. When it is desired to reset the cell 62, as when the punched card of interest has been read and the information has been used, current $I_R$ from a reset pulse supply 77 is at least momentarily fed to a lead 70. A portion of this lead 70 passes closely adjacent to the gate 65 so that flow of current $I_R$ through the lead 70 effects transformation of the gate 65 to its resistive state. This transformation halts current flow through the by-pass circuit 87, thus restoring the cell 62 to its original condition.

The flip-flop memory cell 62 may be connected with other similar cells to provide parallel read out. Thus, for example, other cells 62′, each like the cell 62 described above, may be electrically connected together. Each cell (for example cell 62′) controls its own associated utilization circuits 79′ and 81′. Operating current for each cell may be taken from an adjacent cell, as indicated by the connections between cells 62 and 62′. Thus, the operating current $I_{S1}$ for the output gates of a cell may be derived from the utilization circuits of an adjacent cell.

Figure 5:
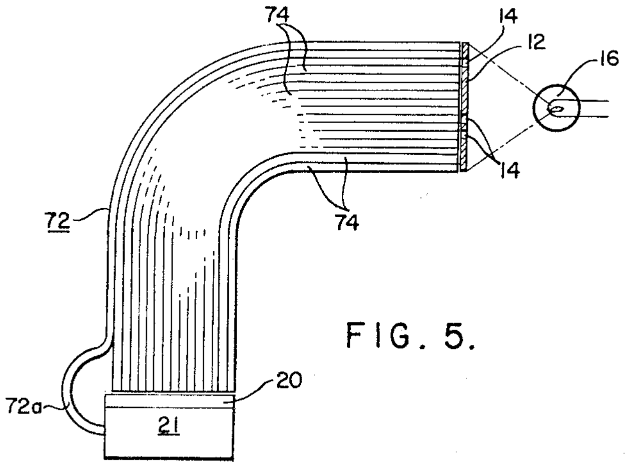
FIG. 5 is a diagram illustrating apparatus according to another embodiment of the invention.

FIG. 5 shows an alternative arrangement for irradiating the storage panel 20. In this arrangement the optical lens 18 of FIG. 1 is omitted and a bundle 72 of flexible light conductors 74, say of a plastic material of the kind known as Lucite, is interposed between the data card 12 and the storage panel 20. The opposite ends of the light conductors 74 are placed closely adjacent to the data card 12 and storage panel 20, respectively, one end of a light conductor 74 being aligned with the expected location of a punched hole 14 of the data card 12, to receive light through the hole, and the other end of the light conductor 74 being aligned with a switch element 34 of the storage panel 20. Light rays passing through the punched holes 14 enter one end of the exposed light conductors 74, are transmitted by multiple reflections along the light conductors 74, and emanate at the opposite ends thereof where they irradiate the corresponding switch elements 34.

Due to the flexibility of the light conductors 74, the bundle 72 may be bent at any desired angle. Furthermore, by spacing the light conductors closer together at one end than at the other end, a data card 12 of relatively large size can be used with a storage panel 20 of relatively smaller size, or vice versa. Also, as indicated by the termination of the light conductor indicated by numeral 72*a*, while all of the information contained in punched cards is located in some location (namely, within an area determined by the dimensions of the card), the information may be taken from the card and fed to spaced-apart locations in a superconductive computer. Thus, the termination point of one light conductor 72*a* may be independent of the termination points of the other conductors.

The light conductors 74 may comprise fibers each of which includes a central core of light conducting material, such as glass or plastic, having a relatively high index of refraction, and a thin sheath or coating of a similar material having a relatively low index of refraction. The ends of the light conductors 74 are optically polished to permit the light rays to freely enter and leave the light conductors 74. The operational and structural characteristics of light conductors are well known, and are explained in further detail, for example, in U.S. Patent 2,939,362, entitled, "Optical Image Transfer Devices," issued to Henry B. Cole.

From the foregoing it is seen that the arrangement of the invention provides improved means for transducing punched card information into superconductive memory storage, and contributes to the versatility of superconductive computer devices.

What is claimed is:

1. Apparatus for converting information stored in a data card containing punched holes to corresponding electrical information, said apparatus comprising: a storage panel including an array of superconductive storage units, each of said storage units including a radiation responsive superconductive switch element and a superconducting inductance portion arranged in a circuit loop, said switch element being responsive to radiant energy impinging thereon to transform said switch element from a superconducting to a resistive state, said inductance portion being constructed to have a substantially higher inductance than said switch element; a radiant energy source arranged to project on said storage panel a radiation pattern formed by projections of said radiant energy through the punched holes of said data card; and means for feeding a bias current to all of the switch elements of said array.

2. Apparatus for converting information stored in a data card containing punched holes to corresponding electrical information, said apparatus comprising: a storage panel including an array of superconductive storage units, each of said storage units including a light responsive superconductive switch element and a superconducting inductance portion arranged in a circuit loop, said switch element being responsive to light impinging thereon to transform said switch element from a superconducting to a resistive state, said inductance portion being constructed to have a substantially higher inductance than said switch element; a light source arranged to project on said storage panel a light pattern formed by projections of said light through the punched holes of said data card; means interposed between said light source and said storage panel for directing the light passing through said holes upon individual ones of said switch elements; and means for feeding a bias current to all of the switch elements of said array.

3. Apparatus according to claim 2, wherein said directing means includes an optical lens system.

4. Apparatus, according to claim 2, wherein said directing means includes a bundle of elongated light conductors arranged to receive said data card at one end thereof and having the opposite end thereof mounted adjacent to said storage panel.

5. Apparatus for converting information stored in a data card containing punched holes to corresponding electrical information, said apparatus comprising: a storage panel including an array of superconductive storage units arranged in rows and columns, each of said storage units including a radiation responsive thin film superconductive switch element and a superconducting inductance portion connected in an electrical parallel circuit, said switch element being responsive to radiant energy impinging thereon to transform said switch element from a superconducting to a resistive state, said inductance portion being constructed to have a substantially higher inductance than said switch element; means connecting said storage units in series; a radiant energy source arranged to project on said storage panel a radiation pattern formed by projections of said radiant energy through the punched holes of said data card, with the rays of radiant energy passing through said holes impinging upon said switch elements; and a source of pulse current connected to apply a series current to said storage units.

6. Apparatus for converting information stored in a data card containing punched holes to corresponding electrical information, said apparatus comprising: a storage panel including an array of superconductive storage units arranged in rows and columns, each of said storage units including a radiation responsive thin film superconductive switch element and a superconducting inductance portion connected in an electrical parallel circuit, said switch element being responsive to radiant energy impinging thereon to transform said switch element from a superconducting to a resistive state, said inductance portion being constructed to have a substantially higher inductance and a higher critical current level relative to said switch element; means connecting said storage units in series; a radiant energy source arranged to project on said storage panel a radiation pattern formed by projections of said radiant energy through the punched holes of said data card, with the rays of radiant energy passing through said holes impinging upon said switch elements; and a source connected to apply a bias current through said storage units in series, said bias current being of a magnitude below the critical current level of said switch element, whereby in the absence of radiation on a switch element, said bias current flows unimpeded through said switch element, and upon irradiating said switch element, said bias current flows through said inductance portion, thereby to induce a persistent current in said irradiated storage unit when said radiation and said bias current are removed sequentially.

7. Apparatus for converting information stored in a data card containing punched holes to corresponding electrical information, said apparatus comprising: a storage panel including an array of superconductive storage units arranged in rows and columns, each of said storage units including a radiation responsive thin film superconductive switch element and a superconducting inductance portion connected in an electrical parallel circuit, said switch element being responsive to radiant energy impinging thereon to transform said switch element from a superconducting to a resistive state, said inductance portion being constructed to have a substantially higher inductance and a higher critical current level relative to said switch element; means connecting said storage units in series; a radiant energy source arranged to project on said storage panel a radiation pattern formed by projections of said radiant energy through the punched holes of said data card, with rays of radiant energy passing through said holes impinging upon said switch elements; a source connected to apply a bias current through said storage units in series, said bias current being of a magnitude below the critical current level of said switch element, whereby in the absence of radiation on a switch element, said bias current flows unimpeded through said switch element, and upon irradiating said switch element, said bias current flows through said inductance portion, thereby to induce a persistent current in said irradiated storage unit when said radiation and said bias current are removed sequentially; and means for sensing the presence of said persistent current in each of said storage units.

8. Apparatus for converting information stored in a data card containing punched holes to corresponding electrical information, said apparatus comprising: a storage panel including an array of superconductive storage units arranged in rows and columns, each of said storage units including a radiation responsive thin film superconductive switch element and a superconducting inductance portion connected in an electrical parallel circuit, said switch element being responsive to radiant energy impinging thereon to transform said switch element from a superconducting to a resistive state, said inductance portion being constructed to have a substantially higher inductance and a higher critical current level relative to said switch element; means connecting said storage units in series; a radiant energy source arranged to project on said storage panel a radiation pattern formed by projections of said radiant energy through the punched holes of said data card, with the rays of radiant energy passing through said holes impinging upon said switch elements; a source connected to apply a bias current through said storage units in series, said bias current being of a magnitude below the critical current level of said switch element, whereby in the absence of radiation on a switch element, said bias current flows unimpeded through said switch element, and upon irradiating said switch element, said bias current flows through said inductance portion, thereby to induce a persistent current in said irradiated storage unit when said radiation and said bias current are removed sequentially; and means for sending the presence of said persistent current in each of said storage units, said sensing means including an array of superconductive members arranged in rows and columns, with one member from each row and each column inductively coupled to each inductance portion of said storage units.

9. Apparatus according to claim 8, wherein said sensing means further includes means connecting said superconductive members in series in each row and in each column, and means for feeding a current, to each row and each column of said superconductive members, of such a magnitude that the total current induced in a storage unit by the coincidence of currents from said rows and columns is below the critical current of said switch element, the sum of said total current and said persistent current being above the critical current of said switch element.

10. Apparatus for converting information stored in a data card containing punched holes to corresponding electrical information, said apparatus comprising: a storage panel including an array of superconductive storage units, each of said storage units including a light responsive superconductive switch element and a superconducting inductance portion arranged in a circuit loop, said switch element being responsive to light impinging thereon to transform said switch element from a superconducting to a resistive state, said inductance portion being constructed to have a substantially higher inductance than said switch element; a light source arranged to direct to said storage panel a light pattern formed by projections of said light through the punched holes of said data card; and a plurality of elongated light conductors each having one end portion oriented in light receiving relationship with respect to the expected location of a data card hole, and having an opposite end portion oriented in light projecting relationship with respect to one of said switch elements, thereby to transmit light from said light source to said switch elements as a function of the information contained in a data card.

11. Light responsive superconductive memory arrangement comprising: a main superconductive circuit including a superconductive element responsive to light impingement in an increased susceptibility to transformation between superconductive and resistive states; biasing means connected to said circuit to pass through said element, during normal operating temperatures of said arrangement, a current flow of a magnitude sufficient to transform said element from the superconductive state to the resistive state during said light impingement, and insufficient to transform said element from the superconductive state to the resistive state in the absence of said light impingement; a superconductive bypass circuit connected to direct said current flow around said main circuit and element during residence of said element in the resistive state; and reset means connected to said bypass circuit to at least momentarily transform a portion of said bypass circuit into the resistive state, thereby to interrupt current flow in said bypass circuit for allowing resumption of current flow through said element in the absence of light impingement on said element.

12. Light responsive superconductive memory arrangement comprising: a main superconductive circuit including a superconductive element responsive to light impingement in an increased susceptibility to transformation between superconductive and resistive states; biasing means connected to said circuit to pass through said element, during normal operating temperatures of said arrangement, a current flow of a magnitude sufficient to transform said element from the superconductive state to the resistive state during said light impingement, and insufficient to transform said element from the superconductive state to the resistive state in the absence of said light impingement; a superconductive bypass circuit connected to direct said current flow around said main circuit and element during residence of said element in the resistive state; and reset means connected to said bypass circuit to at least momentarily transform a portion of said bypass circuit into the resistive state, thereby to interrupt current flow in said bypass circuit for allowing resumption of current flow through said element in the absence of light impingement on said element; two superconductive output gates each having a superconductive output circuit control element connected to provide an output signal therefrom when in a superconductive state and to provide substantially no output signal therefrom when in a resistive state; a first of said gates being connected to be controlled by current flow through said main superconductive circuit and the second of said gates being connected to be controlled by current flow through said bypass circuit whereby substantial current flow through said main circuit, during the absence of light impingement upon the superconductive element thereof, effects transformation of the superconductive control element of said first gate to a resistive state for providing an output signal from said second gate, and substantial current flow through said bypass circuit, during the presence of light impingement upon the main circuit superconductive element, effects transformation of the superconductive control element of said second gate to a resistive state and transformation of the superconductive control element of said first gate to a superconductive state for providing an output signal from said first gate.

References Cited in the file of this patent

UNITED STATES PATENTS

| | | |
|---|---|---|
| 2,189,122 | Andrews | Feb. 6, 1940 |
| 2,413,965 | Goldsmith | Jan. 7, 1947 |
| 2,727,685 | Wilson | Dec. 20, 1955 |

OTHER REFERENCES

Analysis of the Operation of a Persistant-Supercurrent Memory Cell, R. L. Garwin, IBM Journal, Oct. 1957.

Superconductive Memory Cell, C. J. Kraus, IBM Technical Journal, vol. 2, No. 4, Dec. 1959, pp. 131, 132.